United States Patent
Kelly et al.

[11] Patent Number: 5,824,244
[45] Date of Patent: Oct. 20, 1998

[54] LIME MUD REGENERATION PROCESS

[75] Inventors: John T. Kelly, Los Gatos; Mehdi Namazian, Palo Alto, both of Calif.

[73] Assignee: Altex Technologies Corp., Santa Clara, Calif.

[21] Appl. No.: 797,688

[22] Filed: Jan. 31, 1997

Related U.S. Application Data

[63] Continuation of Ser. No. 325,888, Oct. 19, 1994, abandoned.

[51] Int. Cl.$^6$ .............................. B27B 17/00; B29B 17/00
[52] U.S. Cl. ...................... 264/37.29; 264/80; 423/175; 423/177
[58] Field of Search ......................... 264/37, 80, 37.29; 162/29, 30.11, 30.1; 423/155, 175, 177, 637

[56] References Cited

U.S. PATENT DOCUMENTS

| | | | |
|---|---|---|---|
| 3,203,761 | 8/1965 | Neuville | 23/186 |
| 4,627,948 | 12/1986 | Zepter et al. | 264/56 |
| 5,354,375 | 10/1994 | Cohen | 106/792 |

OTHER PUBLICATIONS

KVS (Kennedy Van Saun Corp.), Bulletin MCV, Jun. 1986 pp. 1 & 2.
Adams T.N., et al., "Lime Reburning," Kraft Recovery Operations, 1991 pp. 41–54.
Tran et al., "An Overview of Ring Formation in Lime Kilns", Kraft Recovery Operations, pp. 55–65 1991.
Fuller–Beckenbach, "Shaft Kilns," Sep. 1985, pp. 1–7.
Fuller–Traylor, "Rotary Kilns and Related Equipment", pp. 2–15, prior to 1992.

*Primary Examiner*—Christopher A. Fiorilla
*Attorney, Agent, or Firm*—Flehr Hohbach Test Albritton & Herbert LLP

[57] ABSTRACT

A lime regeneration method and system of apparatus which compacts lime mud into agglomerates of predetermined configurations for improved handling and processing in a subsequent compact, efficient, minimally polluting and low cost reactor vessel in which the mud is dried, heated, calcined and cooled to form a reactive lime product.

29 Claims, 5 Drawing Sheets

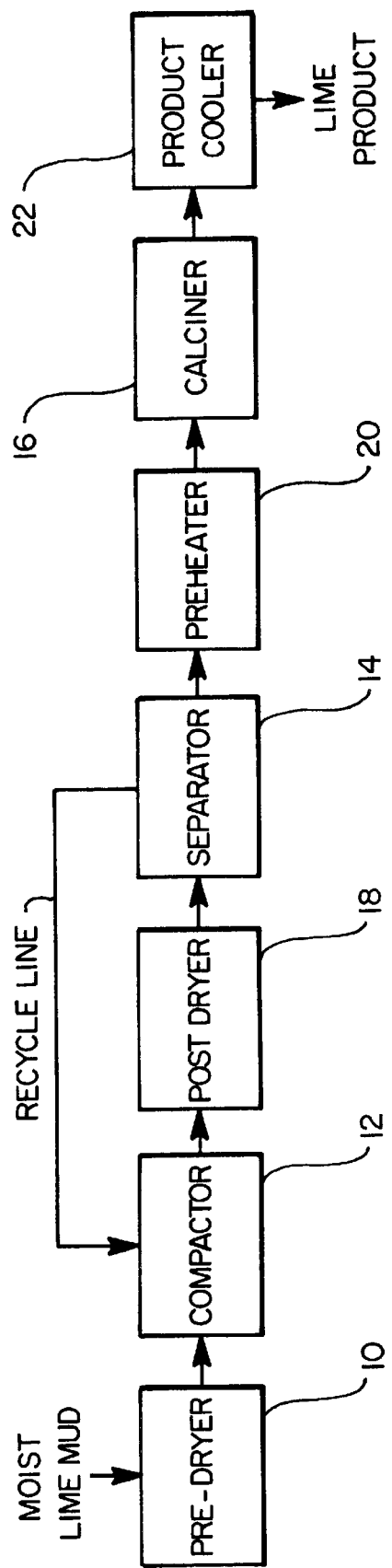
FIG_1

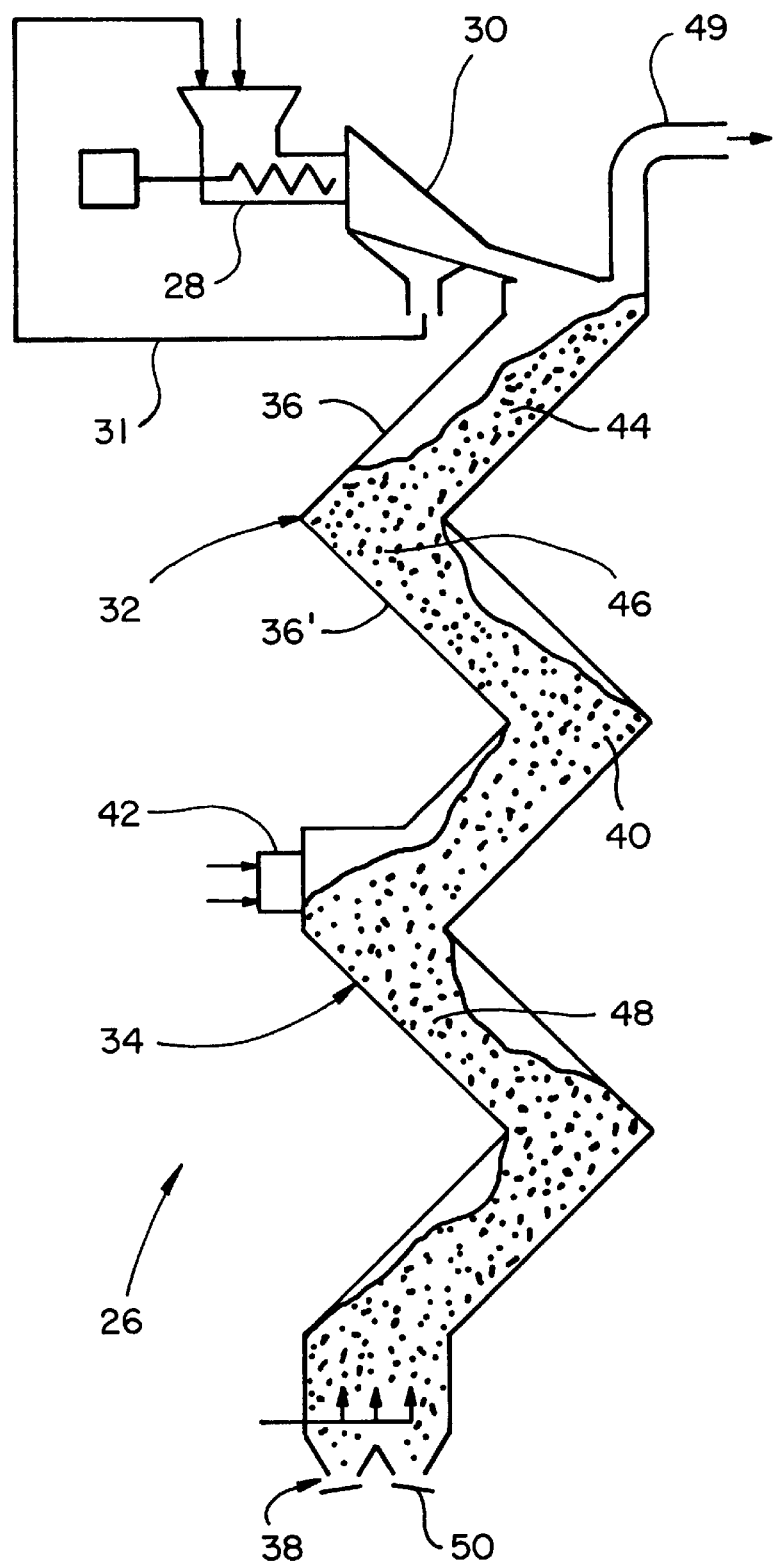
FIG_2

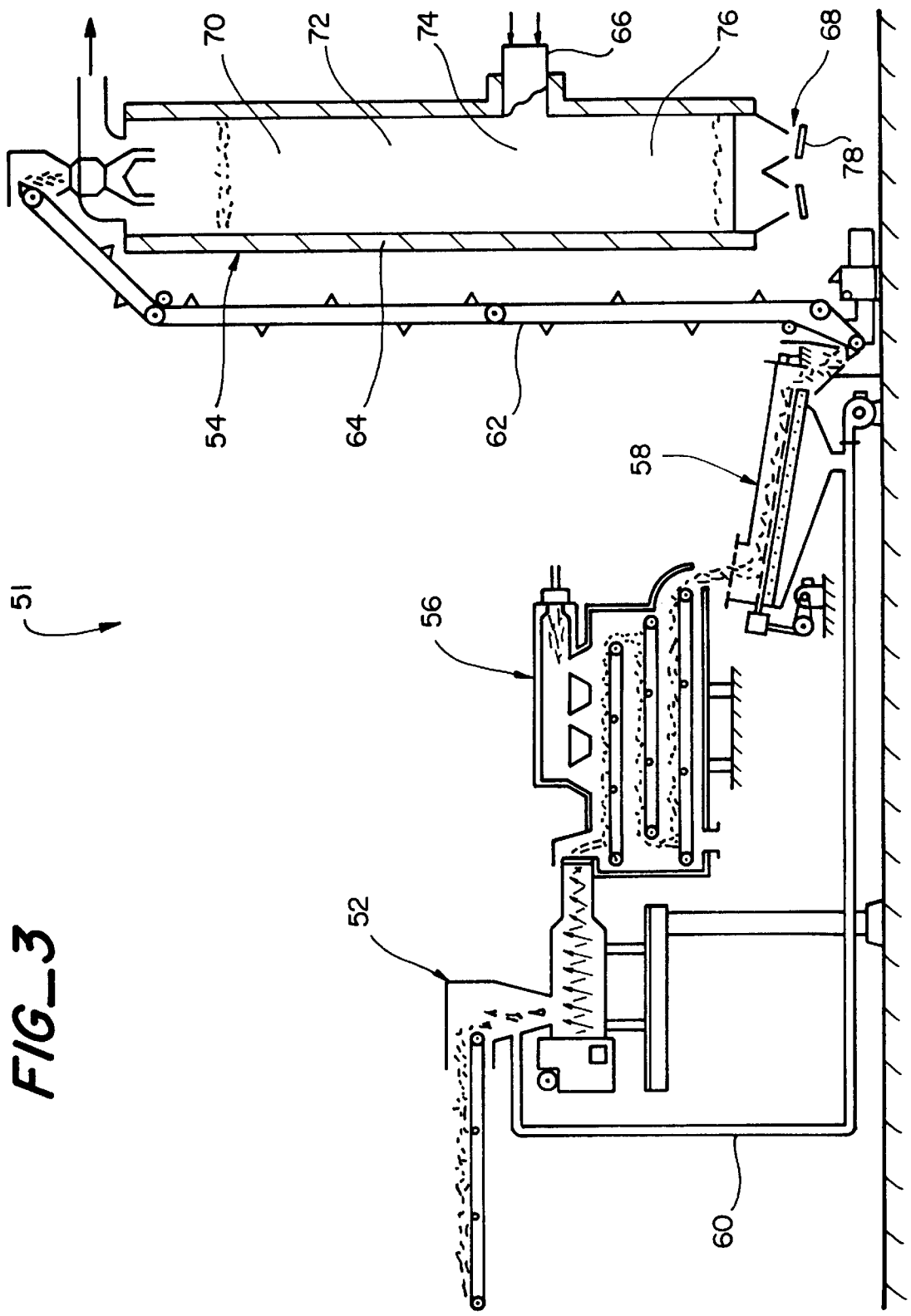
FIG_3

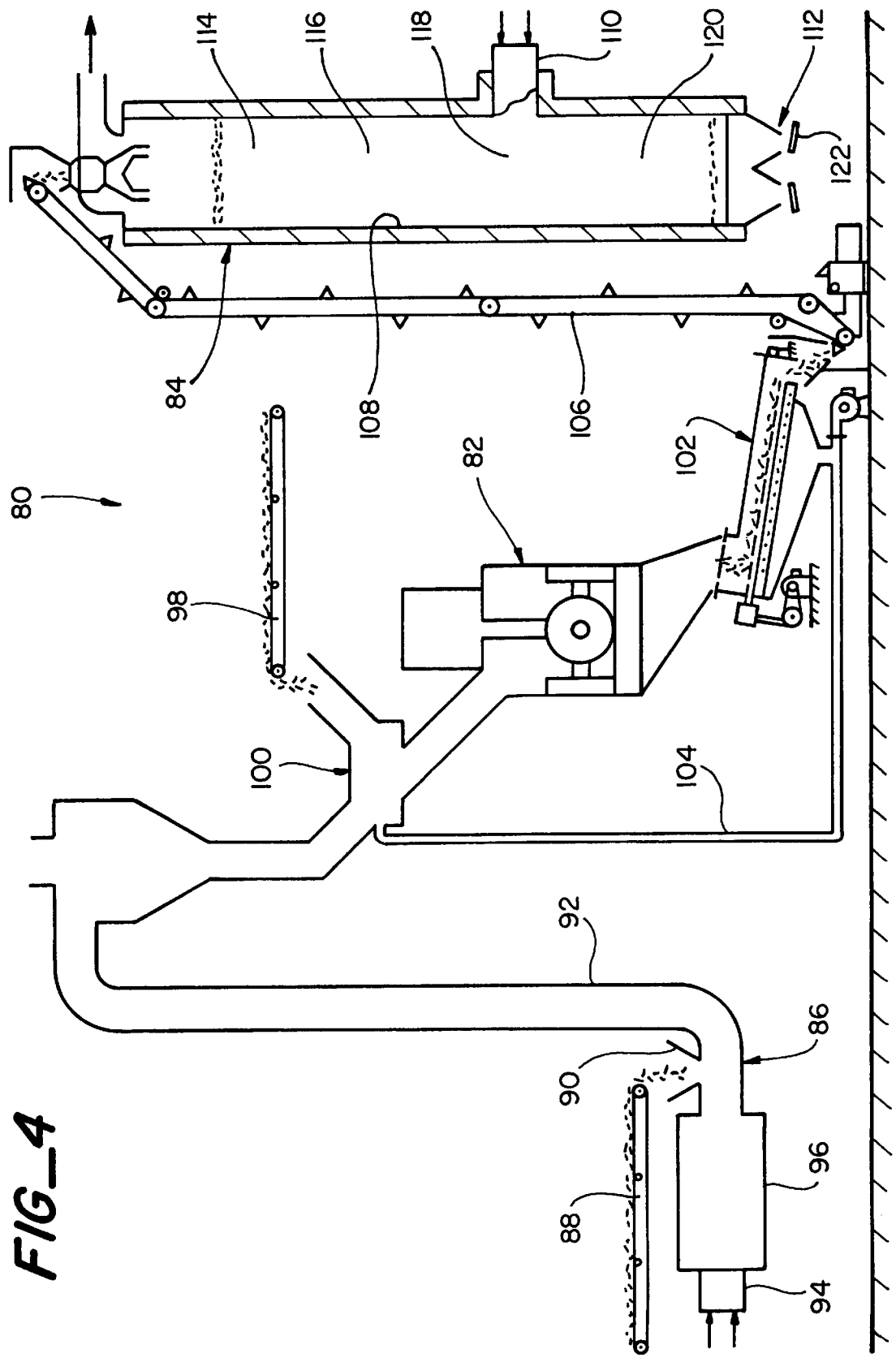
FIG_4

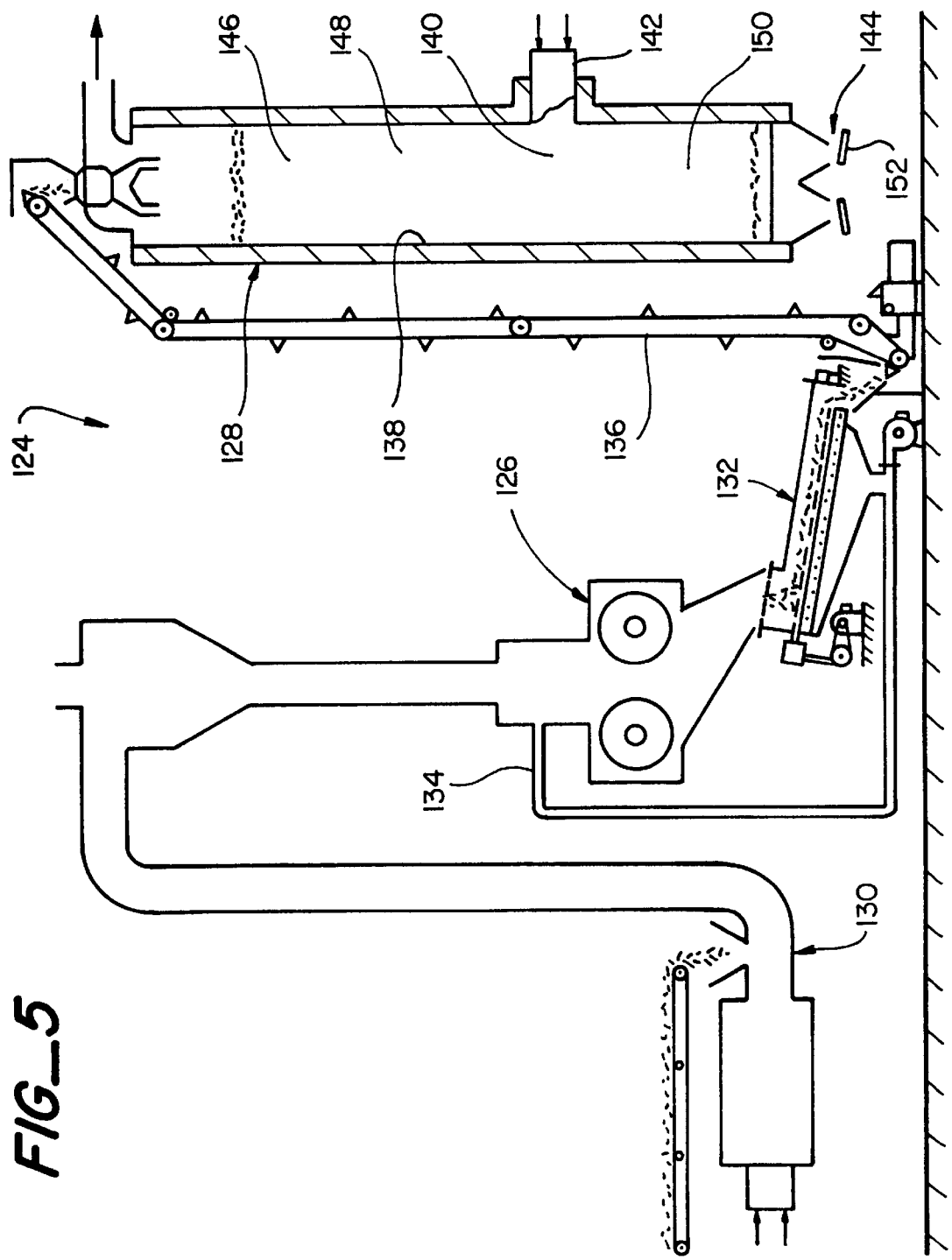
FIG_5

LIME MUD REGENERATION PROCESS

This is a continuation of application Ser. No. 08/325,888 filed Oct. 19, 1994 now abandoned.

BACKGROUND OF THE INVENTION

1. Field of the Invention

This invention relates to the processing of lime mud to produce regenerated reactive lime for the pulp, paper, sugar refining, caustic soda and water treatment industries and the like.

2. Description of the Related Art

Sodium based chemicals in pulp and paper plants are recovered for use by reacting them with lime (CaO). A product of the reaction is precipitated calcium carbonate, which is formed into a fine particulate (e.g. 5 mm particle size) wet cake (e.g. 15 to 35 percent moisture) that has sodium based (e.g. sodium hydroxide and sodium sulfide) and other trace contaminants. To regenerate the lime from the wet cake material into reactive lime, the calcium carbonate is heated to a high temperature, so that the carbonate decomposes, or calcines, back to the original form of reactive lime. Lime regeneration reduces both the need for fresh chemicals in the process and the need for significant spent lime disposal. As used herein, the term "lime" means reactive lime (CaO).

Although lime application is different in industries such as sugar refining, caustic soda production and water treatment, the product is precipitated calcium carbonate in all cases. As in the paper industry, this calcium carbonate can be regenerated into lime through calcination at high temperature. To date, lime regeneration in these industries has been too costly and the practice has not developed to a significant extent. Introduction of lower cost and more efficient equipment could promote the practice of regenerating lime in these industries.

Lime has been regenerated primarily in large and inefficient rotary kilns. This type of kiln has heretofore been used in the industry because of the "sticky" qualities of the material as it is heated. Contaminants in the lime mud, primarily sodium based compounds, cause the lime mud material to stick together at temperatures below the calcination point. If the material sticks together in large deposits, heat and mass transfer will be limited and material processing will be slow and nonuniform. With a long cylindrical rotary kiln, the rotary motion and progressive slumping of the material continuously breaks up and blends the material as it is heated to prevent large deposits from forming. Nevertheless, the "sticky" characteristic of the material, and the rotary motion, eventually causes spherical agglomerates on the order of 1" size to form that are calcined and discharged from the system. Even with continuous agitation, some very large deposits can form that will interrupt the flow of the material and require that the system be shut down and the deposits removed. This has significant negative availability and cost impacts. Thus the "sticky" qualities of lime mud has previously been considered on objectionable problem in lime regeneration processes.

Other types of calciners cannot even reliably produce an acceptable lime product. Suspension type systems, that process the mud as a dust, tend to form large wall deposits that eventually block passages, resulting in frequent unit shutdown. Fluid bed units, that agglomerate the fine dust into small particles, tend to produce large agglomerates and deposits that negatively impact system operation and product quality.

Although rotary kilns can produce an acceptable lime product, these devices have high first cost and operating cost. First cost is high because the units are very large (e.g. 300 feet long) and require complex machinery to support, seal and rotate the entire furnace. Operating costs are high because of substantial heat losses through the large surface area and the limited ability to insulate the rotating furnace. This is a particularly difficult problem with small rotary kilns, where heat losses and energy costs become prohibitive. In addition, furnace rotation requires frequent refractory replacement and maintenance of rotating equipment. This further drives up operating costs. Also, even in rotary kilns large deposits can form that will lead to system shutdown and loss of availability of the equipment.

Given the limitations of rotary kilns in processing lime mud, a method that uses compact vessels and avoids moving parts is desired. This must be accomplished without causing uncontrolled sticking of the material in the unit. The unit must have throughputs characteristic of large rotary kilns. In addition, efficient smaller throughput units are desired that can be used to gradually expand lime regeneration capacity at existing pulp and paper plants. These smaller incremental capacity units could be used to better meet lime demand driven by growth and process changes.

OBJECTS AND SUMMARY OF THE INVENTION

It is a general object of the invention to provide a new and improved low cost, compact minimally polluting and efficient lime regeneration method and system of apparatus.

Another object is to provide a new and improved low cost and compact lime regeneration method and system that can be integrated with pulp and paper plants or with sugar refining, soda ash, and water treatment plants.

The invention in summary provides a lime regeneration system and method of operation in which the lime mud is formed into agglomerates, of a specific configuration, of much larger size than the base mud particles. These agglomerates are then heated and calcined to form a lime product in a vessel, or series of vessels. In the vessels, the agglomerates will have small contact areas with each other relative to their volume. Motion of the agglomerates, as they slowly move through the vessels, will continually break any bonding at their limited contact areas, thereby obviating large scale agglomeration. This is an important advantage of the process. By creating agglomerates that are bound together and yet do not stick to each other, uncontrolled large scale agglomeration of the type that occurs in existing systems is prevented. Therefore the problem of stickiness of the material is turned into an advantage in the subject invention. Furthermore, the agglomerates form a porous bed that has much improved heat and mass transport relative to rotary kilns. As a result, the apparatus can be reduced in size relative to a rotary kiln of the type conventionally used for calcining.

The specific agglomerates used in the invention are formed by compaction equipment at moisture levels compatible with the equipment. If desired, the lime mud could be dried to the needed moisture level before compaction. As required, the agglomerates are post dried to the required moisture level prior to introduction into a calciner vessel, such as a fixed bed kiln. Depending on the calciner vessel design, substantial or little drying may be required. In the calciner vessel, hot gases flow around the agglomerates, heating and calcining them to a final reactive lime product. The flow of hot gases and cool air are arranged so as to recuperate heat generated by combustion into the process to maximize energy efficiency.

The foregoing and additional objects and features of the invention will appear from the following specification in which the several embodiments have been set forth in detail in conjunction with the accompanying drawings.

BRIEF DESCRIPTIONS OF DRAWINGS

FIG. 1 is a flow chart in accordance with one embodiment of the invention process.

FIG. 2 is a schematic drawing of another embodiment of the invention.

FIG. 3 is a schematic drawing of another embodiment which includes a screw extruder.

FIG. 4 is a schematic drawing of another embodiment which includes a pellet press.

FIG. 5 is a schematic drawing of another embodiment which includes a briquetter.

DESCRIPTION OF THE PREFERRED EMBODIMENT

In the drawings FIG. 1 illustrates in concept form the general process of the invention. In the general process, the moist lime mud typically contains from 15 to 35% moisture by weight and consists of precipitated calcium carbonate and trace contaminants. The contaminants comprise primarily sodium hydroxide (NaOH) and sodium sulfide ($Na_2S$) which together comprise from about 1% to 2% by weight of the lime mud. The lime mud can be introduced into a predryer step 10 to reduce the moisture level for the subsequent compaction step 12. The moisture level desired for the compaction step is that which enables the mechanical pressure of the compactor to form the lime mud into discrete agglomerates of sufficient strength for subsequent handling. The amount of predrying required can be reduced, as required, by the recycle from a subsequent separation step of lower moisture content debris from a subsequent compaction step. If the moisture content of the combined fresh lime mud and recycled debris is compatible with the compaction step then the predrying step is not required.

The lime mud is formed by compaction step 12 into agglomerates of specific configurations for optimal processing in subsequent steps, particularly the calcination step 16. In the compaction step, the lime mud is mechanically brought together under pressure to bind the material into the agglomerates of the specific configurations. Water and contaminants in the lime mud act as binding or adhering agents. These binding agents, plus mechanical binding, must bind the particles through the complete process. As needed, additional contaminants or specific binders can be added to the moist lime mud to facilitate binding of the material.

The agglomerates produced by compaction step 12 can be solid cylinders, hollow cylinders, spheres, pillows, pellets, briquettes, plates or other geometric configurations by which their outer surfaces are shaped to minimize the contact area with one another and thereby inhibit the agglomerates from sticking together during subsequent processing steps. The agglomerates are sized and shaped so that when juxtaposed together as in a bed then the interstitial voids or spaces which are formed between adjacent pellets are sufficient to present relatively low resistance to gas flow through the bed. As used herein, "agglomerates" means any such configurations which produce these results. Configurations of cylindrical shape having mean diameters in the range of from about 0.125" to 2" and with a length to diameter ratio of from 1:1 to 10:1 are suitable for use in the invention. As used herein, the words "cylinder" and "cylindrical" include cross sections of circular, oval, triangular, square, rectangular or other polygonal or geometric shapes. The optimum length to diameter ratio is approximately 3:1. As an example, a cylindrical extruded pellet of 0.375" mean diameter and a length of 1.125" produces satisfactory results. The specific agglomerate configuration will depend on the specific compaction and calciner equipment used in the process. Depending on subsequent step needs, it may be required to dry the agglomerates in a post drying step 18 prior to introduction into the separation step 14. The extent of post drying will depend on the needs of the subsequent processing equipment.

In separation step 14, the dust and other debris from the drying and compaction steps are separated from the well-formed agglomerates. The agglomerates are introduced into a preheater step 20, while the debris and dust are recycled back to the compactor step 12.

The agglomerates that are introduced into the preheating step 20 are brought up to calcination temperature, which typically is in the range of 1600° to 1800° F. In this preheater step, gases that contain excess heat from the calcination step are used to efficiently preheat the material. The gases in the preheat step are at a temperature which is sufficient to cause the sodium based contaminants to transform, melt and bind the calcium carbonate particles together and stiffen at least the outer surface layers of the pellets. As used herein, "stiffen" means binding the particles sufficient to form rigid or semi-rigid agglomerates, i.e. agglomerates which are sufficiently flexible so that they can bend. This preheat temperature is in the range of substantially 300°–1600° F. The different species of sodium based contaminants which exist prior to or that form during preheating comprise NaOH, $Na_2S$, $Na_2SO_4$ and $Na_2S_2O_7$. When $Na_2S$ is heated to the required temperature for oxidation it transforms into $Na_2SO_4$ and $Na_2S_2O_7$. NaOH melts at about 620° F. and $Na_2S_2O_7$ melts at about 750° F. so that these contaminants act to bind the particles during preheat. $Na_2SO_4$ melts at about 1600° F. and thus acts to bind the particles during calcining. Furthermore, in certain of the specific embodiments these same components could be used in either or both of the drying steps 10 and 18. By utilizing the energy in the gases to preheat the agglomerates, system efficiency can be maximized. Following preheating, the agglomerates are moved at step 16 into a calcination zone where fuel and air are combusted to produce heated gases at least about 1600° F. to fully calcine the material. In this step the gases flow counter, parallel, or a combination of counter and parallel, through a porous bed of agglomerates to ensure calcination of the material into the reactive lime product. The agglomerates are directed through the calcination zone in a slow, continuous rate of movement. Preferably the rate of movement is sufficient to provide a 4 to 16 hour residence time for the agglomerates in the calcination zone. Following the calcination step, the agglomerates are moved into a product cooler 22 for the cooldown step where cold air needed for fuel combustion cools the material and recuperates heat back into the process. This also maximizes energy efficiency.

Although the process in FIG. 1 indicates a specific sequence of steps, some steps can be rearranged. For example, the separator step that follows the post dryer step could be inserted after the compactor step or preheater step. In addition, depending on the quality of the compactor step, the separator step could be completely eliminated. This demonstrates the potential flexibility of the process.

FIG. 2 illustrates generally at 26 a system of apparatus for an embodiment that utilizes a combination of existing commercial equipment together with equipment designed and built specifically for the process. A suitable screw extruder 28 is used as the compactor to form the moist lime mud into agglomerates. The discharge end of the extruder has die openings or orifices of the desired cross sectional size and shape, such as circular where the agglomerate is to be formed into a circular cylinder. Die openings in the range of ¼" to ¾" diameter are suitable for use in the invention. The agglomerates could also be formed by other types of compactors, such as pellet mills or pellet presses, into cylinders or other shapes without the need for additional binder agents. If an additional binder agent is utilized, then spherical agglomerates can be formed using a disc pelletizer, not shown. Binder agents that can advantageously be used for this purpose comprise sugar molasses, hydrated lime or spent kraft pulping liquor. When the lime mud contains moisture then lime could also be added as the binding agent in that the lime combines with water to form hydrated lime. With lime added to the dry mud, $CO_2$ could be injected to form carbonated lime which acts as the binding agent. The binder agents are added with the input supply of lime mud going into the compactor.

Following agglomerate formation, debris such as dust from the compaction step is separated from the agglomerates by a suitable vibrating screen device 30. The debris is recycled back into extruder 28 by means of conduit 31. Other separators, using air as well as mechanical means, could also be employed for this purpose. The agglomerates are then introduced into a specially designed vertical oriented fixed bed reactor 32 that carries out the post dryer step 18, preheater step 20, calciner step 16 and product cooldown step 22 of FIG. 1. In the embodiment of FIG. 2, all of these steps are accomplished consecutively in reactor 32. This reactor comprises a heavily insulated, refractory lined vessel forming a serpentine chamber 34. The chamber 34 allows the agglomerates to slowly cascade down alternating sloped walls 36, 36' through counterflowing gases which move in a direction from bottom to top, as viewed in FIG. 2. At the junctures of the sloped walls the material moves vertically, thereby exposing the material to the full flow of the gases. Furthermore, during the cascading process the material is turned over and mixed, yielding a more uniform heat exchange contact of the agglomerates and gas, and thereby a more uniform processing of the agglomerates. This permits the use of smaller diameter agglomerates that have better heat transfer characteristics. Using the smaller agglomerates, the agglomerate residence time in the reactor and thereby system volume can be minimized.

The major fraction of the processing gas originates as cold combustion air that is moved into the bottom end 38 of the reactor by suitable means such as a blower, not shown. Fuel and a limited amount of additional air are injected into reaction or calcining zone 40 at burner 42. The injected fuel and air intermix and combust in the reaction zone to generate the heat needed for agglomerate drying, preheating and calcining processes that occur in the respective post dryer zone 44, preheater zone 46 and calcining zone 40. The gases that exit the drying zone 44 will have been cooled to a low temperature on the order of 300° F. As a result, stack heat losses for the reactor will be low.

The burner 42 is oriented so that most of the heat release occurs within the bed of agglomerates where the fuel meets the major portion of upwardly flowing air. By burning in the porous bed, mostly flameless combustion occurs and pollutant formation is minimized. The calcination or reaction zone 40 will have a temperature in the range of approximately 1600° F. to 1800° F. to calcine the agglomerates into a reactive lime product. The preheat zone 46 and drying zone 44 will have temperatures that decrease from the calcination temperature to the 300° F. exit gas temperature. Exhaust gases are removed from the top of the reactor by means of an exhaust stack 49.

As the hot lime product is moved by gravity down from the calcination zone, the cold air flowing upwardly through a product cooler zone 48 will cool the agglomerates. The cooled product is then removed by suitable means such as a vibrating hopper arrangement 50 provided at the bottom of the reactor. By recapturing the heat energy of the agglomerates in the combustion air, product heat loss is minimized. This aspect, combined with low exhaust and reactor shell heat losses, results in a very efficient system. Also, the agglomerate drying, heating and calcining steps are integrated into one reactor to simplify the system. Lastly, with the small agglomerates utilized in this system, integrated reactor size and costs are minimized.

As an alternative to the serpentine reactor illustrated in FIG. 2, the top portion of the reactor could be oriented vertically. In such a configuration, the moist agglomerates will fall downward by gravity through the upflowing gases. For the proper size agglomerates and gas velocity, the descent of the agglomerates will be slowed. Sufficient residence time of the agglomerates in the vertical oriented top portion will then be available to at least surface dry the agglomerates so that the contaminants will be heated sufficient to melt and bind or adhere the outer portions of the agglomerates. The partially dried agglomerates will then fall into a section, either serpentine or vertical, where they form a porous bed of agglomerates. In the bed the agglomerates will be completely dried, heated, calcined and cooled as described above.

FIG. 3 illustrates another embodiment providing apparatus 51 that utilizes existing commercial equipment comprising a screw extruder 52 as the compactor and a simple vertical shaft kiln 54. The screw extruder 52 is used to form the moist lime mud into agglomerates without the need for additional binder. Following agglomerate formation, the agglomerates are dried to low moisture content using a conveyor type dryer 56. Other suitable dryers could also be utilized for this purpose. Dust and debris from agglomerate formation are then separated from the agglomerates by a suitable vibrating screen device 58. The dust and debris are recycled back through conduit 60 into compactor 52. Other separators, using air as well as mechanical means, could also be employed for this purpose. The agglomerates are then moved by a bucket elevator 62 or any other suitable transport device into the simple vertical shaft kiln or reactor 54 which provides a fixed bed reactor that dries, preheats, calcines and cools the agglomerates.

Reactor 54 is comprised of a heavily insulated, refractory lined vessel 64 forming a chamber through which the agglomerates move slowly downward while the gases flow upwards in a counterflowing manner. The agglomerates are suitably sized and shaped to provide substantial interstitial voids in the bed to facilitate uniform, low resistance gas flow. Fuel and a limited amount of additional air are introduced by means of one or more burners 66 located on the side of the kiln. The bulk of the combustion air is moved into the bottom opening 68 of the kiln by suitable means such as a blower, not shown. The input air then mixes and reacts with the fuel in a flameless mode within the bed. This moderates flame temperature and emissions, particularly NOx. Heat released by the combustion is effective to dry the agglomerates within drying zone 70, preheat the agglomerates in preheat zone 72 and calcine them in reaction zone 74 to produce reactive lime product. The hot calcined product is cooled in product cooler zone 76 by the upward flowing combustion air so that heat is recovered back into the process. The cooled agglomerates are discharged at the bottom of the kiln through means such as vibrating table hoppers 78 or other suitable agglomerate discharge devices.

FIG. 4 illustrates another embodiment providing apparatus 80 that can also utilize existing commercial equipment comprising the pellet press compactor 82 and a simple vertical shaft kiln 84. Pellet presses require less moisture than screw extruders for optimal compaction. Apparatus 80 also comprises a suitable flash dryer 86 which is used to quickly dry a portion of the moist lime mud feed mixture. The lime mud is moved by conveyor 88 into an opening 90 at the bottom of vertical pipe 92 which forms a part of the flash dryer. A burner 94 injects fuel and air for burning in combustion chamber 96 at the upstream end of the flash dryer.

From the flash dryer the dry lime mud is then mixed with moist lime mud which is moved by a conveyor 98 into suitable pin mixer 100 to obtain the 15 to 20% moisture content that is desired for the pellet press 82. Other dryers and mixers could be used for this purpose. Pellet press 82, which can be of the type that is commercially available, is used to form the lime mud into pellets without the need for additional binder. If necessary, binder agents of the type described for use with the embodiment of FIG. 2 can be added to the supply of lime mud which is input to the pellet press. Following pellet formation, dust and debris produced by the pellet formation are separated from the pellets by a suitable vibrating screen device 102. The dust and debris are recycled back to the mixer 100 by means of conduit 104. Other separators, using air as well as mechanical means, could also be employed for this purpose. The pellets are then moved by a bucket elevator 106 or other suitable transport device into the simple vertical shaft kiln or reactor 84 which provides a fixed bed reactor that dries, preheats, calcines and cools the pellets.

Reactor 84 is comprised of a heavily insulated, refractory lined vessel forming a chamber 108 through which the pellets move slowly downward while the hot gases flow upwardly in a counterflowing manner. The pellets are suitably sized and shaped to provide substantial interstitial voids in the bed to facilitate uniform, low resistance gas flow. Fuel and a limited amount of additional air are introduced into one or more burners 110 located on the side of the kiln. The bulk of the combustion air is moved by suitable means such as a blower, not shown, into the bottom of the kiln through an inlet 112. The input air then mixes and reacts with the fuel in a flameless mode within the bed of pellets. This moderates flame temperature and emissions, particularly NOx. Heat released by the combustion dries the pellets at drying zone 114, preheats at preheat zone 116 and calcines at reaction zone 118 to form reactive lime product. The hot calcined product is cooled in product cooler zone 120 by the upward flowing combustion air so that heat is recovered back into the process. The cooled product is discharged at the bottom of the kiln through vibrating table hoppers 122 or other suitable pellet discharge devices.

FIG. 5 illustrates another embodiment providing apparatus 124 which can comprise existing commercial equipment, including a briquetter compactor 126 and a simple vertical shaft kiln 128. Briquetters require less moisture for optimal compaction than do screw extruders and pellet presses. The lime mud moisture content for briquettes should be no more than 5%. The briquettes can also be formed by using dry lime mud in the process.

Apparatus 124 further comprises a flash dryer 130, which can be of the type described for the embodiment of FIG. 4, to quickly dry a portion of the moist lime mud feed mixture. Other suitable dryers could be used for this purpose. Briquetter compactor 126 receives the dried lime mud from the flash dryer and forms it into agglomerates without the need for additional binder. If necessary, suitable binder agents, of the type described for use with the embodiment of FIG. 2, can be added to the lime mud input into compactor 126. Following agglomerate formation, dust and debris from the agglomerate formation are then separated by a suitable vibrating screen device 132. The dust and debris are recycled back to the briquetter by means of a conduit 134. Other separators, using air as well as mechanical means, could also be employed for this purpose. The agglomerates are then moved by a bucket elevator 136 or any other suitable transport device into the top of vertical shaft kiln or reactor 128 which provides a fixed bed reactor that dries, preheats, calcines and cools the agglomerates.

Kiln 128 is comprised of a heavily insulated, refractory lined vessel forming a chamber 138 through which the agglomerates move slowly downward while the hot gases flow upwardly in a counterflowing manner. The agglomerates are suitably sized to provide substantial interstitial voids in the bed to facilitate uniform, low resistance gas flow. Fuel and a limited amount of additional air are injected into a reaction zone 140 by one or more burners 142 located on the side of the kiln. The bulk of the combustion air is moved by suitable means such as a blower, not shown, into the bottom of the kiln through an inlet 144. The input air then mixes and reacts with the fuel in a flameless mode within the bed. This moderates flame temperature and emissions, particularly NOx. Heat released by the combustion dries the agglomerates at drying zone 146, preheats them at preheat zone 148 and calcines them at reaction zone 140 to form a reactive lime product. The hot calcined product is cooled at cooler zone 150 by the upward flowing combustion air so that heat is recovered back into the process. The cooled agglomerates are discharged at the bottom of the kiln through vibrating table hoppers 152 or other suitable agglomerate discharge device.

The above embodiments, illustrated in FIGS. 2 to 5, have disclosed a counterflow type shaft kiln, where the gas flows counter to the agglomerates. Other types of kilns could be used in the invention. Regenerative multishaft kilns, where flow alternates from one shaft to another are of particular interest because of their high efficiency. In addition, some kilns, regenerative or otherwise, have parallel as well as counterflow gas/agglomerate flows. In these systems sharp peaks in temperatures can be avoided. These systems produce a more reactive, or soft burned, lime than typical counterflow kiln designs. All of these systems are possible for use in this invention for processing lime and mud agglomerates.

An example of the use and operation of the invention on a sub-scale is as follows. A screw extruder was used to form the lime mud into cylindrical agglomerates having mean diameters of 0.125", 0.187", 0.25", 0.375" and 0.75". Length to diameter ratios of the agglomerates ranged from 1:1 to 10:1. A length to diameter ratio of approximately 3:1 gave good agglomerate resistance to breakage, while producing a loose porous bed where gas flow and processing was uniform. Also, 0.25" diameter cylindrical pellets were formed using a pellet press. At the proper moisture level, the agglomerates did not stick and could be transported into a reactor for drying, heating, calcining and cooling.

Even agglomerates that were wet on the outside and stacked together for processing could be easily separated after calcination. Heating the agglomerates to 700° F. or above increased the agglomerate strength. At these temperatures, and higher, the contaminants in the material become strong binders. The role of sodium contaminants as an important binder was illustrated by performing calcium carbonate agglomerate formation and heating tests with and without sodium contaminants. With sodium contaminants, heating the agglomerates substantially increased their strength. Without sodium contaminants, heating did not increase agglomerate strength. Agglomerates were calcined over a range of temperatures. Temperatures above 1850° F. and a long processing time (e.g. greater than four hours) produced hard but relatively unreactive agglomerates in hydration tests. Tests at shorter times and lower calcination temperatures produced strong agglomerates with good reactivity. These results support processing the agglomerates at 1800° F. or lower in a kiln for best reactivity.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A process for regenerating reactive lime from lime mud which is comprised of a) precipitated calcium carbonate particles, b) water and c) contaminates comprised of sodium compounds, the process comprising the steps of compacting an input supply of the lime mud in a compaction zone under a mechanical compaction pressure which is sufficient to form the lime mud into discrete agglomerates which have outer surface portions and interior portions, binding the calcium carbonate particles together sufficient to stiffen at least the outer surface portions of the agglomerates, causing a plurality of the stiffened agglomerates to come adjacently together in a three-dimensional bed of agglomerates in a reaction zone with interstitial spaces being formed between adjacent agglomerates, enabling the bed of agglomerates to move in a downward path responsive to gravity, and directing a gas through said interstitial spaces in heat exchange relationship with the agglomerates with the gas being at a reaction temperature which is sufficient to calcine the agglomerates and decompose the calcium carbonate into reactive lime whereby motion of the agglomerates during calcination breaks bonding at agglomerate contact areas obviating large scale agglomeration.

2. A method as in claim 1 in which the binding step is carried out by heating the agglomerates to a post drying temperature sufficient to cause the contaminates to bind with the calcium carbonate particles on said outer surface layers.

3. A process as in claim 1 in which the binding step is carried out by binding the calcium carbonate particles together sufficient to stiffen substantially the interior portions of the agglomerates.

4. A process as in claim 3 in which the binding step is carried out by heating the agglomerates to a binding temperature sufficient to cause the contaminates to bind with the calcium carbonate particles.

5. A process as in claim 4 in which said binding temperature is in the range of substantially 700° to 1600° F.

6. A process as in claim 1 in which the binding step is carried out by admixing a binding agent with the lime mud and causing the binding agent to bind with the calcium carbonate particles.

7. A process as in claim 6 in which said binding agent is selected from the group consisting of sugar, molasses, hydrated lime and spent kraft pulping liquor.

8. A process as in claim 1 in which the compacting step is carried out by forming the agglomerates into configurations which have outer surfaces that are shaped sufficient to come into contact with one another at discrete contact areas for inhibiting the agglomerates from sticking together.

9. A process as in claim 8 in which said configurations are curved sufficient to a degree which limits the contact area between agglomerates to inhibit the agglomerates from sticking together when placed adjacent to each other.

10. A process as in claim 8 in which the compacting step is carried out by extruding the input supply of lime mud through an orifice which has a cross sectional shape which produces an extrudate of lime mud having said configurations.

11. A process as in claim 8 in which the compacting step is carried out by passing the lime mud through a pellet mill which is operable to form the agglomerates into said predetermined configurations.

12. A process as in claim 8 in which the compacting step is carried out by passing the lime mud through a pellet press which is operable to form the agglomerates into predetermined configurations.

13. A process as in claim 8 in which the compacting step forms the agglomerates into configurations which define cylinders having a mean diameter in a range of about 0.125" to 2" and a length to diameter ratio of about 1:1 to 10:1.

14. A process as in claim 1 in which debris is produced during the compaction step, the process including the step of separating the debris from the agglomerates, and recycling the separated debris into the input supply of lime mud.

15. A process as in claim 1 including the step of heating the input supply of lime mud to a temperature which is sufficient to predry the lime mud to a moisture content which is sufficient to enable said compaction pressure to form the lime mud into discrete agglomerates.

16. A process as in claim 15 in which debris is produced during the compaction step with the debris being separated from the agglomerates, and the predrying step is carried out by recycling the separated debris into the input supply of lime mud with the debris absorbing moisture from the lime mud.

17. A process as in claim 1 in which the step of calcining the agglomerates is carried out by moving the agglomerates along a path in a vessel which contains said reaction zone, passing heated gas along the reaction zone and through said interstitial spaces in heat exchange relationship with the agglomerates which are moving along the path, and causing the agglomerates within the reaction zone to tumble in contact with the heated gas.

18. A process as in claim 17 in which said path includes at least a section which is downwardly directed, and the agglomerates are caused to move downwardly under the influence of gravity as they tumble within the reaction zone.

19. A process as in claim 18 in which said downwardly directed section inclines at an oblique angle from vertical, and the agglomerates are caused to cascade along the downwardly directed section while heated gas is passed in heat exchange relationship with the cascading agglomerates.

20. A process as in claim 17 which includes directing said heated gas in counterflow relation to the direction of movement of the agglomerates within the reaction zone.

21. A process as in claim 17 which includes the steps of moving the agglomerates from the reaction zone into a cooldown zone, passing a stream of input air at a temperature below said reaction temperature through said cooldown zone in heat exchange relationship with the agglomerates in the reaction zone, and heating the input air with heat from the reaction product within the cooldown zone while cooling the reaction product.

22. A process as in claim 21, which includes the step of burning a fuel with said heated input air in said reaction zone to generate gases at said reaction temperature.

23. A process as in claim 1 including the steps of moving the agglomerates from the compaction zone into a preheat zone, preheating the agglomerates in the preheat zone to a preheat temperature, and moving the preheated agglomerates into said reaction zone.

24. A process as in claim 1 including the step of moving the agglomerates to a post drying zone, and drying the agglomerates in the post drying zone to another predetermined moisture content sufficient to dry at least the surfaces of the agglomerates to a degree which prevents adjacent agglomerates from sticking to one another.

25. A process as in claim 1 including the step of moving the reactive lime into a cooldown zone, and cooling the reactive lime in the cooldown zone to a temperature below said reaction temperature.

26. A process as in claim 25 in which the step of cooling the reactive lime is carried out by directing a stream of input air in heat exchange relationship with the reactive lime in the cooldown zone with the input air being heated by the reactive lime, directing the heated input air into the reaction zone, and combusting the heated input air in the reaction zone with a fuel to generate combustion gases at said reaction temperature for calcining the agglomerates.

27. A process for regenerating reactive lime from lime mud which is comprised of a) precipitated calcium carbonate particles, and b) contaminates comprised of sodium compounds, the process comprising the steps of compacting an input supply of the lime mud in a compaction zone under a mechanical compaction pressure which is sufficient to form the lime mud into discrete agglomerates which have outer surface portions, binding the calcium carbonate particles together sufficient to stiffen at least the outer surface portions of the agglomerates, causing a plurality of the stiffened agglomerates to come adjacently together in a three-dimensional bed of agglomerates in a reaction zone with interstitial spaces being formed between adjacent agglomerates, enabling the bed of agglomerates to move in a downward path responsive to gravity and directing a gas through said interstitial spaces in heat exchange relationship with the agglomerates with the gas being at a reaction temperature which is sufficient to calcine the agglomerates and decompose the calcium carbonate into reactive lime whereby motion of the agglomerates during calcination breaks bonding at agglomerate contact areas obviating large scale agglomeration.

28. A process as in claim 27 in which said binding step is carried out by adding to the lime mud a binding agent selected from the group consisting of sugar, molasses, hydrated lime, lime and spend kraft pulping liquor.

29. A process as in claim 27 in which the lime mud comprises water present in the range of from about 0% to 5% by weight, and said binding step is carried out by compressing the lime mud into briquettes which form said agglomerates with the briquettes being placed together in said reaction zone.

* * * * *